(12) United States Patent
Kolb et al.

(10) Patent No.: US 10,886,848 B2
(45) Date of Patent: Jan. 5, 2021

(54) DC-TO-DC CONVERTER AND METHOD FOR OPERATING A DC-TO-DC CONVERTER

(71) Applicant: SCHAEFFLER TECHNOLOGIES AG & CO. KG, Herzogenaurach (DE)

(72) Inventors: Johannes Kolb, Karlsruhe (DE); Juergen Remmlinger, Karlsruhe (DE); Mario Gommeringer, Stockach (DE); Alexander Schmitt, Karlsruhe (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 51 days.

(21) Appl. No.: 15/761,269

(22) PCT Filed: Sep. 26, 2016

(86) PCT No.: PCT/DE2016/200447
§ 371 (c)(1),
(2) Date: Mar. 19, 2018

(87) PCT Pub. No.: WO2017/059855
PCT Pub. Date: Apr. 13, 2017

(65) Prior Publication Data
US 2018/0262109 A1 Sep. 13, 2018

(30) Foreign Application Priority Data
Oct. 7, 2015 (DE) .......... 10 2015 219 338

(51) Int. Cl.
*H02M 3/158* (2006.01)
*H02M 3/335* (2006.01)
(Continued)

(52) U.S. Cl.
CPC ....... *H02M 3/158* (2013.01); *H02M 3/33584* (2013.01); *H02J 3/381* (2013.01); *H02M 3/335* (2013.01); *H02M 2001/0093* (2013.01)

(58) Field of Classification Search
CPC .. H02M 3/158; H02M 3/33584; H02M 3/335; H02M 2001/0093; H02J 3/381
See application file for complete search history.

(56) References Cited

U.S. PATENT DOCUMENTS 8,629,661 B2 * 1/2014 Shimada ........... H02M 3/33507
307/66
8,958,221 B2 2/2015 Adam
(Continued)

FOREIGN PATENT DOCUMENTS

| CN | 102739092 A | 10/2012 |
|---|---|---|
| DE | 10018943 A1 | 10/2001 |
| EP | 2911284 A1 | 8/2015 |

OTHER PUBLICATIONS

International Search Report for Application No. PCT/DE2016/200447, dated Feb. 23, 2017, 5 pages.
(Continued)

Primary Examiner — Adolf D Berhane
Assistant Examiner — Kevin H Sprenger

(57) ABSTRACT

A DC-to-DC converter, comprising a first, second, and third DC voltage network, and a first, second, and third DC-DC regulator, wherein the first, second, and third regulator each having a DC voltage main connection that is supplied with a DC voltage network voltage related to a common reference potential, a respective DC voltage network current flowing through each connection, the DC-DC regulators being coupled via a first DC-link capacitor connected between a first DC-link potential and a second DC-link potential, and the DC-DC regulators are each coupled with a DC-link regulator, via which the first DC-link potential or the second
(Continued)

DC-link potential can be set independently of the DC voltage network voltages and the DC voltage network currents.

20 Claims, 2 Drawing Sheets

(51) Int. Cl.
  *H02M 1/00* (2006.01)
  *H02J 3/38* (2006.01)

(56) References Cited

U.S. PATENT DOCUMENTS

| | | | | |
|---|---|---|---|---|
| 2007/0025125 A1* | 2/2007 | Nakahori | ............... | H02M 1/32 363/56.02 |
| 2011/0090717 A1* | 4/2011 | Lee | ............... | H02M 3/33584 363/21.02 |
| 2012/0250373 A1* | 10/2012 | Adam | ............... | H02M 3/3374 363/37 |
| 2013/0027984 A1* | 1/2013 | Takegami | ............... | H02M 1/34 363/21.01 |
| 2013/0155735 A1* | 6/2013 | Ilic | ............... | H02M 7/72 363/71 |
| 2014/0313788 A1* | 10/2014 | Okubo | ............... | H02M 1/12 363/21.01 |
| 2014/0334189 A1* | 11/2014 | Yan | ............... | H02M 3/33584 363/17 |

OTHER PUBLICATIONS

Office Action for Chinese Application No. 201680056299.X, dated Jul. 11, 2019, 8 Pages.

* cited by examiner

US 10,886,848 B2

DC-TO-DC CONVERTER AND METHOD FOR OPERATING A DC-TO-DC CONVERTER

CROSS-REFERENCE TO RELATED APPLICATIONS

This application is the U.S. National Phase of PCT/DE2016/200447 filed Sep. 26, 2016, which claims priority to DE 102015219338.1 filed Oct. 7, 2015, the entire disclosures of which are incorporated by reference herein.

TECHNICAL FIELD

The disclosure relates to a DC-to-DC converter for coupling at least three DC voltage networks, the converter comprising at least three DC-DC regulators, each regulator having a DC voltage mains connection that is supplied with a DC voltage network voltage related to a common reference potential, a respective DC voltage network current flowing through each connection. The DC-DC regulators are coupled via a first DC link capacitor which is connected between a first DC link potential and a second DC link potential, the first DC link potential and the second DC link potential being different from the common reference potential. Furthermore, the disclosure relates to a method for operating such a DC-to-DC converter.

BACKGROUND

EP 2 911 284 A1 discloses a DC-to-DC converter for a solar system, over which it is possible to control the power flow of multiple solar modules to an inverter. This DC-to-DC converter comprises multiple DC-DC regulators, each of which having a DC voltage network voltage that is applied to a common reference potential. Furthermore, the DC-to-DC converter comprises a DC-DC regulator, which generates a further DC voltage network voltage to the common reference potential and supplies it to the inverter. The DC-DC regulators are coupled via a DC link capacitor which is connected between a first DC link potential and a second DC link potential. The first DC link potential and the second DC link potential being different from the common reference potential, so that the DC link capacitor can be supplied with a voltage that is considerably lower than the respective DC voltage network voltages of the solar modules or the inverter. In this DC-to-DC converter, the switching losses in the DC-DC regulators are reduced due to the low voltage over the DC link capacitor. However, it proved to be disadvantageous that the DC voltage network voltage at the inverter, which represents an output voltage in regular operation of the solar system, is dependent on the power flow in the DC-to-DC converter, especially dependent on the DC voltage network voltage of the solar module, so that it is only to a limited extent possible to set the output voltage.

SUMMARY

Against this background, the disclosure has the objective of increasing the range in which the individual DC voltage network voltages can be set. This may be achieved by using a DC-to-DC converter for coupling at least three DC voltage networks, the converter comprising at least three DC-DC regulators, each regulator having a DC voltage mains connection that is supplied with a DC voltage network voltage related to a common reference potential, a respective DC voltage network current flowing through each connection, the DC-DC regulators being coupled via a first DC link capacitor, which is connected between a first DC link potential and a second DC link potential, the first DC link potential and the second DC link potential being different from the common reference potential, and the DC-DC regulators being coupled with a DC link regulator, via which the first DC link potential and/or the second DC link potential can be set, independently of the DC voltage network voltages and the DC voltage network currents.

The DC-DC regulators of the DC-to-DC converter can be coupled via the first DC link capacitor in such a way that a first DC link voltage is supplied via the first DC link capacitor to the DC-DC regulators. In addition to the DC-DC regulators, to which the individual DC voltage network voltages of the DC voltage networks are supplied, a DC link regulator is provided, by which it is possible to set the first DC link potential and/or the second DC link potential, especially related to the common reference potential, without requiring that one or multiple DC voltage network voltages or DC voltage network currents must be changed. Thus, the DC link regulator makes it possible that the individual DC voltage network voltages can be set, independently of one another. As a result, the individual DC voltage network voltages can be freely set in a much larger range.

According to one advantageous embodiment, a second DC link capacitor is connected between the second DC link potential and the common reference potential, or a third DC link capacitor is connected between the first DC link potential and the common reference potential. In this respect, the DC-to-DC converter comprises a divided DC link having two DC link capacitors connected in series. Alternatively, the first DC link potential and the second DC link potential cannot be coupled via a DC link capacitor with the common reference potential. Therefore, they can be separated from the common reference potential, thus forming a DC-to-DC converter having a floating DC link.

For setting the first DC link potential and/or the second DC link potential, a DC link voltage supplied via the first DC link capacitor can be set by using the DC link regulator, independently of the DC voltage network voltages and the DC voltage network currents. The DC link regulator can be connected with the first DC link capacitor and the second DC link capacitor, so that the first DC link voltage supplied to the first DC link capacitor can be set directly via the DC link regulator.

In an embodiment of the DC-to-DC converter having a second DC link capacitor between the second DC link potential and the common reference potential, it is advantageous when for setting the first DC link potential and/or the second DC link potential a second DC link voltage can be set by the DC link regulator between the second DC link potential and the common reference potential, independently of the DC voltage network voltages and the DC voltage network currents. In such an embodiment, the first DC link potential and/or the second DC link potential can be changed via the DC link regulator.

In an embodiment of the DC-to-DC converter having a third DC link capacitor between the first DC link potential and the common reference potential, it is advantageous when for setting the first DC link potential and/or the second DC link potential a third DC link voltage can be set by the DC link regulator between the first DC link potential and the common reference potential, independently of the DC voltage network voltages and the DC voltage network currents.

In such an embodiment, the first DC link potential and/or the second DC link potential can be changed via the DC link regulator.

According to one advantageous embodiment, it is provided that the DC link regulator is connected with the common reference potential, so that a bypass direct current can flow via the DC link regulator in the direction of the common reference potential and vice versa, which bypass direct current in particular does not flow through the DC-DC regulators of the DC-to-DC converter.

One preferred embodiment provides that a DC voltage network voltage is supplied to the DC link regulator, and the DC link regulator has a potential separation. Via the DC link regulator having potential separation, energy can be transferred between the DC link and a DC voltage mains connection of the DC-to-DC converter, the potentials of the DC link being separated from the potentials supplied to the DC voltage mains connection of the DC-to-DC converter. The DC link regulator may involve a single-quadrant controller or a two-quadrant controller with potential separation. For example, the DC link regulator can comprise a transformer for potential separation having a primary side and a secondary side, with a full-bridge circuit being provided on the primary side, as well as the secondary side. Further exemplary embodiments of the DC link regulator involve flyback converters, forward converters, push-pull converters or resonant converters.

Alternatively, the DC link regulator can be connected with the first DC link potential, the second DC link potential and the common reference potential. In this respect, it is not required that the DC link regulator has a potential separation.

According to a further alternative, the DC link regulator can be connected with one of the DC voltage mains connections, the first DC link potential and the common reference potential.

According to another alternative, the DC link regulator can be connected with one of the DC voltage mains connections, the second DC link potential and the common reference potential.

The DC link regulator may be configured in the form of a half-bridge circuit. The DC link regulator can comprise two semiconductor switches connected in series, one center point between the two semiconductor switches being connected, which may be an inductor, with a first potential of the three potentials. The other two potentials are each connected with one of the two semiconductor switches of the DC link regulator, so that the first potential can be optionally connected with one of the other two potentials. Alternatively, the DC link regulator can be configured in the form of a charge punk, CUK converter, zeta converter or SEPIC converter.

An advantageous embodiment provides that the DC-DC regulators are configured in the form of half-bridge circuits. The DC link regulators can comprise a first semiconductor switch and a second semiconductor switch, which are connected in series, the first semiconductor switch being connected with the first DC link potential, the second semiconductor switch being connected with the second DC link potential, and a center point connected with the first semiconductor switch and the second semiconductor switch is connected, which may be via an inductor, with the DC voltage mains connection of the DC-DC regulator. It is possible to supply a DC voltage network voltage related to the common reference potential to the DC voltage mains connection.

According to a further preferred embodiment, the DC-to-DC converter comprises more than three, in particular four, five, six, seven, eight, nine or ten DC-DC regulators, each having a DC voltage mains connection, to which one DC voltage network voltage related to the common reference potential is supplied and through which a DC voltage network current flows. More than three DC voltage networks, for example, energy sources, energy storage systems or energy users can be connected via the more than three DC-DC regulators.

Furthermore, the above-mentioned objective may be achieved by using a method for operating a DC-to-DC converter for coupling at least three DC voltage networks, the converter comprising at least three DC-DC regulators, each regulator having a DC voltage mains connection that is supplied with a DC voltage network voltage related to a common reference potential, a respective DC voltage network current flowing through each connection. The DC-DC regulators are coupled via a first DC link capacitor which is connected between a first DC link potential and a second DC link potential, the first DC link potential and the second DC link potential being different from the common reference potential. The first DC link potential and/or the second DC link potential can be set via a DC link regulator, independently of the DC voltage network voltages and the DC voltage network currents.

The method can achieve the same advantages that have already been described in the context of the DC-to-DC converter.

Furthermore, in the method, the advantageous characteristics described in the context of the DC-to-DC converter can be used alone or in combination.

BRIEF DESCRIPTION OF THE DRAWINGS

Further details and advantages of the disclosure are described below by embodiments shown in the drawings. At the same time, the drawings illustrate embodiments of the disclosure only in exemplary manner and do not limit the inventive idea. It is shown.

DETAILED DESCRIPTION

Figure 1:
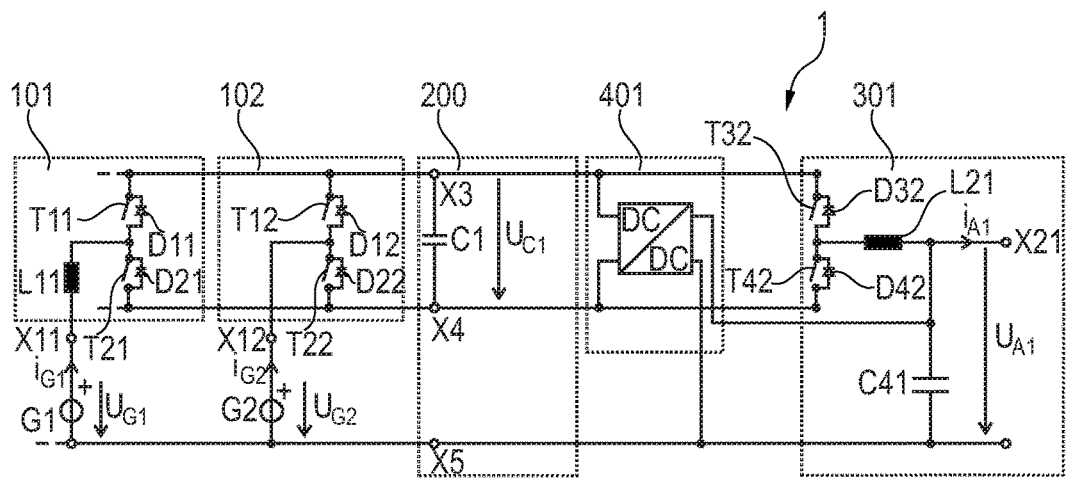
FIG. 1 a block diagram of a DC-to-DC converter according to a first embodiment.

In the different figures, similar parts are provided with the same reference numerals. Therefore, they are also named or mentioned only once.

FIG. 1 shows a block diagram of a DC-to-DC converter 1 according to a first embodiment. Multiple DC voltage networks can be coupled via the DC-to-DC converter 1. In the present case, a first and a second DC voltage network, each having an energy source G1, G2, can be connected via the DC-to-DC converter 1 with a third DC voltage network. Energy storage systems, such as batteries or capacitors, or energy converters, such as fuel cells, solar cells or generators, can be used as energy sources G1, G2 at the DC voltage mains connections X11, X12. To connect the energy sources G1, G2, the DC-to-DC converter 1 comprises multiple individual DC voltage mains connections X11, X12, which are supplied with a DC voltage network voltage UG1, UG2 related to a common reference potential X5. Individual DC voltage network currents IG1, IG2 flow respectively into the first DC voltage mains connection X11 and the second DC voltage mains connection X12. In addition, the DC-to-DC converter 1 comprises the third DC voltage mains connection X21, which is connected with the third DC voltage network. At the third DC voltage mains connection X21 and the common reference potential X5, an inverter (not shown) is connected, for example, for connecting an electrical machine or for connecting with a public electricity network.

Basically, the DC voltage mains connections X11, X12, X21 of the DC-to-DC converter can be optionally connected with a DC voltage network, which has an energy source or an energy sink or both.

The DC-to-DC converter 1 comprises a floating DC link 200, via which multiple DC-DC regulators 101, 102, 301 of the DC-to-DC converter 1 are connected. Optionally it is possible to connect further DC-DC regulators with the DC link 200 in addition to the three DC-DC regulators 101, 102, 301 shown.

The DC link 200 comprises a first DC link potential X3 and a second DC link potential X4, between which a DC link capacitor C1 is connected in which electrical energy can be stored temporarily when operating the DC-to-DC converter 1. Both DC link potential X3, X4 are different from the common reference potential X5. The floating configuration of the DC link 200 has the advantage that a DC link voltage UC1 is supplied via the DC link capacitor C1, which DC link voltage UC1 is significantly lower than the input voltages UG1, UG2 and the output voltages UA1 of the DC-to-DC converter 1. This reduces switching losses in the DC-DC regulators 101, 102, 301, and it becomes possible to use more cost-effective components in the DC-DC regulators 101, 102, 301 configured for lower performance.

In this DC-to-DC converter 1, without the DC link regulator 401, the third DC voltage network voltage UA1 between the third DC voltage mains connection X21 and the common reference potential X5 is basically depending on the first DC voltage network voltage UG1 between the first DC voltage mains connection X11 and the common reference potential X5, as well as the second DC voltage mains connection X12 between the second DC voltage mains connection X12 and the common reference potential X5, as well as of the first DC voltage network current IG1 and the second DC voltage network current IG2. To increase the range in which the third DC voltage network voltage UA1 can be set, a DC link regulator 401 is provided at the DC-to-DC converter 1, via which DC link regulator 401 the first DC link potential X3 and/or the second DC link potential X4 can be set, independently of the DC voltage network voltages UG1, UG2, UA1 and the DC voltage network currents IG1, IG2, IA1. According to the first embodiment, the DC link regulator 401 is connected with the first DC link potential X3 and the second DC link potential X4, so that the DC link regulator 401 can directly set the DC link voltage UC1 supplied via the DC link capacitor. The DC link regulator 401 is also connected with the third DC voltage mains connection X21 and the common reference potential X5. In this respect, the third DC voltage network voltage UA1 is supplied at the DC link regulator 401. To prevent undesirable feedbacks, the DC link regulator 401 comprises potential separation.

Figure 2:
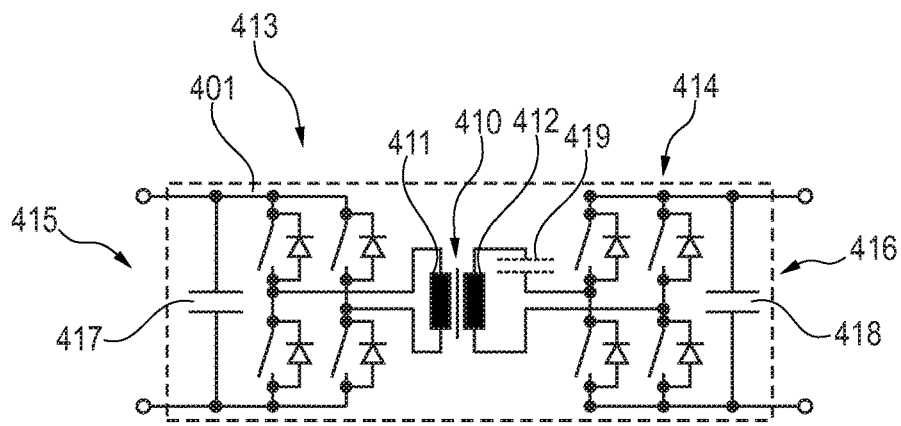
FIG. 2 a block diagram of a DC link regulator according to a first embodiment.

FIG. 2 shows one embodiment of a DC link regulator 401 comprising potential separation. The DC link regulator 401 comprises a transformer 410 for potential separation having a primary side winding 411 and a secondary side winding 412. The primary side winding 411 of the transformer 410 is connected via a full-bridge circuit 413 with the primary side connection 415 of the DC link regulator 401. The secondary side winding 412 is connected via a full-bridge circuit 414 with the secondary side connection 416 of the DC link regulator 401. Additional capacitors 417, 418 are provided at the secondary side connection 416 and at the primary side connection 415. Optionally, a capacitor 419 can be connected in series with the primary side or the secondary side winding 412 of the transformer 410 to allow for a resonant switching mode of the DC link regulator 401. The DC link regulator 401 is configured in the form of a two-quadrant controller, which allows for a bidirectional energy exchange between the primary side connection 415 and the secondary side connection 416. The stray inductance of the transformer 410 is used for current injection. Optionally it is possible to provide a series connected inductance in addition to the primary side winding 411 and the secondary side winding 412.

Different from the embodiment shown in FIG. 1, an input voltage UG1, UG2 can be applied at the primary side connection 415 of the DC link regulator 401. In this case, the respective DC voltage mains connection X11, X12 and the common reference potential X5 are connected with the DC link regulator 401. Also in this case, the DC link regulator 401 should comprise a potential separation.

Figure 3:
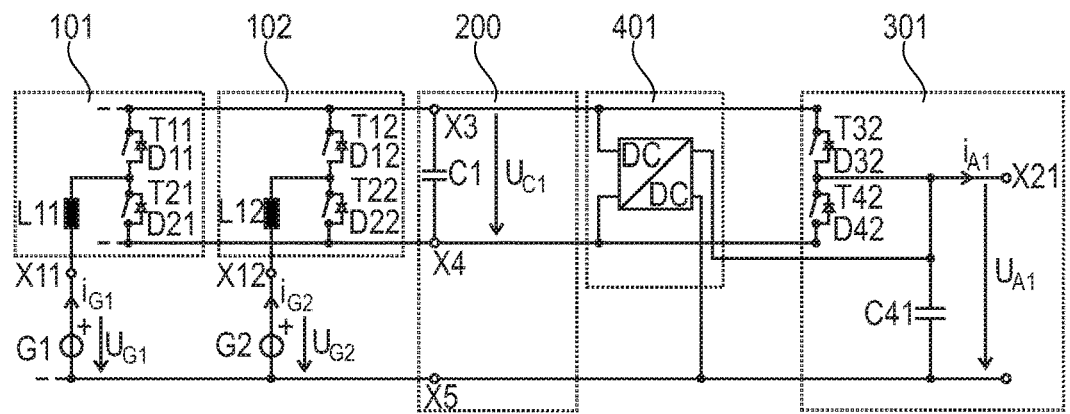
FIG. 3 a block diagram of a DC-to-DC converter according to a second embodiment, FIG. 4 a block diagram of a DC-to-DC converter according to a third embodiment, FIG. 5 a block diagram of a DC link regulator according to a second embodiment.

FIG. 3 shows a second embodiment of a DC-to-DC converter 1 comprising a floating DC link and a DC link regulator 401. In contrast to the DC-to-DC converter 1 according to the first embodiment, the second DC-DC regulator 102 has an inductor L12, which is connected between the DC voltage mains connection X12 and the center point of the series connection of the semiconductor switches T12, T22. In this respect, the first DC-DC regulator 101 and the second DC-DC regulator 102 are configured in identical manner. Furthermore, the DC-to-DC converter 1 of the first embodiment differs in that the third DC-DC regulator 301 is configured without an inductor. The center point of the series connection of the semiconductor switches T32, T42 is directly connected with the third DC voltage mains connection X21.

Figure 4:
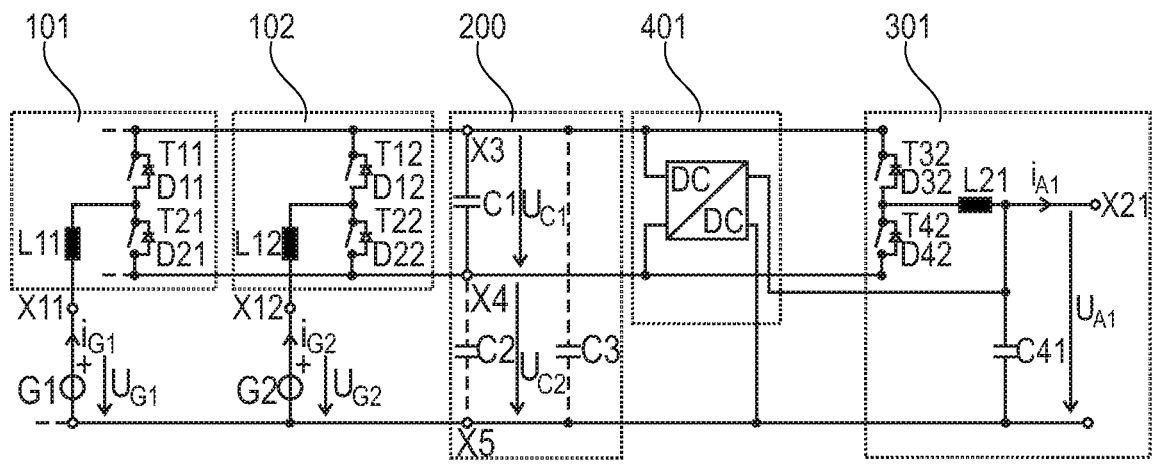

FIG. 4 shows a third embodiment of a DC-to-DC converter 1. This DC-to-DC converter 1 comprises a divided DC link 200 having a first DC link capacitor C1 and a further DC link capacitor C2, C3 connected in series to the first DC link capacitor C1. The further DC link capacitor can be connected either between the second DC link potential X4 and the common reference potential X5, subsequently depicted as second DC link capacitor C2, or it is connected between the first DC link potential X3 and the common reference potential X5, subsequently depicted as third DC link capacitor C3.

In the DC-to-DC converter 1 according to the third embodiment, the first and the second DC-DC regulators 101, 102 are configured in the form of half-bridges, each having an inductor L11, L12 for current injection connected with the DC voltage mains connection X11, X12. The third DC-DC regulator 301 is configured in the form of a half-bridge circuit having two series connected semiconductor switches T22, T42 and an inductor L21 connected with the third DC voltage mains connection X21.

In this embodiment, the DC-DC regulators 101, 102, 301 are configured in the form of half-bridge circuits. They comprise each three poles X11, X12, X21, X3, X4. A first DC-DC regulator comprises two half-bridge circuits T11, T21 connected in series. Parallel to each half-bridge circuit T11, T21, a free-wheeling diode D11, D21 is connected, which protects the half-bridge circuits T11, T21 against overvoltages. Furthermore, the first DC-DC regulator 101 comprises an inductor L11, which is arranged between the first DC voltage mains connection X11 and a center point of the series connection of the two half-bridge circuits T11, T21. A first input voltage UG1 related to the common reference potential X5 is applied at the first DC-DC regulator 101. Depending on the switching position of the half-bridge circuits T11, T21, the first DC voltage mains connection X11 can be connected with the first DC link potential X3 or the second DC link potential X4. A second DC-DC regulator 102 also comprises two semiconductor switches T12, T22 connected in series. Free-wheeling diodes D12, D22 connected in series are provided for the semiconductor switches T12, T22. Compared to the first DC-DC regulator 101, the second DC-DC regulator 102 does not have an inductor connected with the second DC voltage mains connection X12. The second DC voltage mains connection X12 is connected directly with the center point of the series connection of the two semiconductor switches T12, T22. The third DC-DC regulator 301 is also configured in the form of a half-bridge circuit and thus has three poles X3, X4, X21. The third DC-DC regulator 301 comprises a series connection of two semiconductor switches T32, T42. A free-wheeling diode D32, D42 is connected parallel to each semiconductor switch T32, T42. Furthermore, the third DC-DC regulator 301 comprises an inductor L21 which is connected between the center point of the series connection of the transistors T32, T42 and the third DC voltage mains connection X21. At the output of the output regulator 301, also a capacitor C41 is provided, which is connected between the third DC voltage mains connection X21 and the common reference potential X5. Via the capacitor C41, a DC voltage network voltage UA1 of the DC-to-DC converter 1 is supplied. The DC voltage network current IA1 of the third DC voltage network flows via the third DC voltage mains connection X21.

Different from the embodiment shown in FIG. 4, the DC link regulator 401 can be connected in parallel with the second DC link capacitor C2 or in parallel with the third DC link capacitor C3, so that it is possible to set either the second DC link voltage UC2 supplied via the second DC link capacitor C2 or the third DC link voltage UC3 supplied via the third DC link capacitor C3. For example, when the DC link regulator 401 is connected with the second DC link potential X4 and the common reference potential X5, it is possible to set the second DC link potential X4, independently of the DC voltage network voltages UG1, UG2, UA1 and the DC voltage network currents IG1, IG2, IA1. When the output of the DC link regulator 401 is connected with the first DC link potential X3 and the common reference potential X5, it is possible to set the first DC link potential X3, independently of the DC voltage network voltages UG1, UG2, UA1 and the DC voltage network currents IG1, IG2, IA1.

In the DC-to-DC converter 1 described above, the common reference potential can involve a common neutral reference potential, a common positive reference potential or a common negative reference potential.

Figure 5:
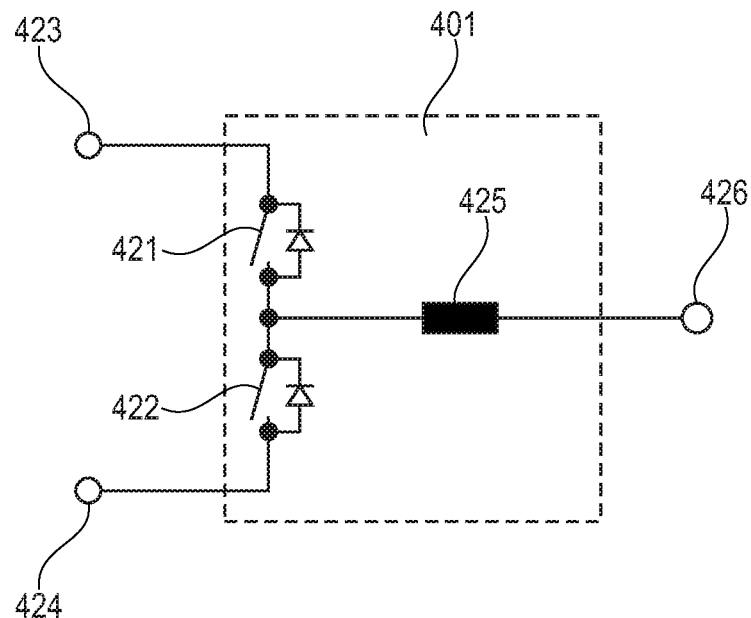

Alternatively, it is possible to use in the DC-to-DC converter 1 described above a DC link regulator 401 that is different construction. Subsequently, a further possible construction of a DC link regulator 401 is described in an exemplary manner by the representation shown in FIG. 5. The DC link regulator 401 according to the second embodiment shown in FIG. 5 is configured in the form of a half-bridge circuit. It comprises two series connected semiconductor switches 412, 422, a center point between the two semiconductor switches 412, 422 being connected via an inductor 425 with an input pole 426. The output poles 423, 424 are each connected with one of the semiconductor switches 412, 422 of the DC link regulator 401. In the embodiment according to FIG. 4, the DC link regulator 401 configured in the form of a half-bridge circuit can be connected with the first DC link potential X3, the second DC link potential X4 and the common reference potential X5.

According to a first alternative, the input pole 426 is connected with the second DC link potential X4, a first output pole 423 is connected with the first DC link potential X3 and the output pole 424 is connected with the common reference potential X5.

A second alternative provides that the input pole 426 is connected with a DC voltage mains connection X11, X12, X21, the first output pole 423 is connected with the first DC link potential X3 and the second output pole 424 is connected with the common reference potential X5.

According to a third alternative, the input pole 426 is connected with the second DC link potential X4, the first output pole 423 is connected with one of the DC voltage mains connections X11, X12, X21 and the second output pole 424 is connected with the common reference potential X5.

In the DC-to-DC converter 1 described above, the input regulator 101, 102, the output regulator 301 and/or the DC link regulator 301 can alternatively be configured in the form of a multiphase regulator having multiple series connected half-bridge circuits. Using multiphase regulators results in a reduction of current ripple.

In the DC-to-DC converter 1 described above, the semiconductor switches T11, T21, T12, T22, T32, T42 can be configured in the form of power semiconductor switches, in particular a MOSFET, IGBT, JFET or bipolar transistors. It is possible in different branches of the half-bridge circuits to substitute the respective semiconductor switch with a diode, especially in such applications in which a unidirectional current flow is anticipated in the respective branch of the half-bridge circuit. Also, certain diodes D11, D21, D22, D32, D42 can be omitted with unidirectional current flow.

As explained by the drawings, the embodiments of DC-to-DC converters 1 for coupling at least three DC voltage networks comprise at least three DC-DC regulators 101, 102, 301, each regulator having a DC voltage mains connection X11, X12, X21 that is supplied with a DC voltage network voltage UG1, UG2, UA1 related to a common reference potential X5, a respective DC voltage network current IG1, IG2, IA1 flowing through each connection. The DC-DC regulators 101, 102, 301 are coupled via a first DC link capacitor C1 which is connected between a first DC link potential X3 and a second DC link potential X4, the first DC link potential X3 and the second DC link potential X4 being different from the common reference potential X5. Furthermore, the DC-to-DC converters 1 comprise a DC link regulator 401, via which the first DC link potential X3 and/or the second DC link potential X4 can be set, independently of the DC voltage network voltages UG1, UG2, UA1 and the DC voltage network currents IG1, IG2, IA1. As a result, the individual DC voltage network voltages UG1, UG2, UA1 can be freely set in a much larger range.

LIST OF REFERENCE NUMERALS

1 DC-to-DC converter
101 first DC-DC regulator
102 second DC-DC regulator
200 DC link 301 third DC-DC regulator
401 DC link regulator
410 transformer
411 winding
412 winding
413 full-bridge circuit
414 full-bridge circuit
415 primary side connection
416 secondary side connection
417 capacitor
418 capacitor
419 capacitor
421 semiconductor switch
422 semiconductor switch
423 output pole
424 output pole
425 inductor
426 input pole
C1 first DC link capacitor
C2 second DC link capacitor
C3 third DC link capacitor
D11 free-wheeling diode
D21 free-wheeling diode
D12 free-wheeling diode
D22 free-wheeling diode
D32 free-wheeling diode
D42 free-wheeling diode
G1 energy source
G2 energy source
IA1 third DC voltage network current
IG1 first DC voltage network current
IG2 second DC voltage network current
L11 inductor
L12 inductor
L21 inductor
UA1 third DC voltage network voltage
UG1 first DC voltage network voltage
UG2 second DC voltage network voltage
T11 semiconductor switch
T21 semiconductor switch
T12 semiconductor switch
T22 semiconductor switch
T32 semiconductor switch
T42 semiconductor switch
X11 first DC voltage mains connection
X12 second DC voltage mains connection
X21 third DC voltage mains connection
X3 first DC link potential
X4 second DC link potential
X5 common reference potential

The invention claimed is:

1. A DC-to-DC converter for coupling at least three DC voltage networks, comprising:
at least three DC-DC regulators, wherein each regulator includes a DC voltage main connection that is supplied with a DC voltage network voltage related to a common reference potential and wherein each of the three DC-DC regulators include two or more semiconductor switches, a respective DC voltage network current flowing through each connection, wherein the at least three DC-DC regulators being coupled via a first DC link capacitor that is connected between a first DC link potential and a second DC link potential, the first DC link potential and the second DC link potential being different from the common reference potential; and
a DC link regulator that includes a transformer having a primary side winding and a secondary side winding, wherein the primary side winding of the transformer is connected via a full-bridge circuit with a primary side connection of the DC link regulator, wherein the DC link regulator is also configured to set the first DC link potential or the second DC link potential independent of the DC voltage network voltages and the DC voltage network currents.

2. The DC-to-DC converter of claim 1, wherein a second DC link capacitor is connected between the second DC link potential and the common reference potential, or a third DC link capacitor is connected between the first DC link potential and the common reference potential.

3. The DC-to-DC converter of claim 1, wherein when setting the first DC link potential or the second DC link potential, a first DC link voltage supplied via the first DC link capacitor can be set by using the DC link regulator, independently of the DC voltage network voltages and the DC voltage network currents.

4. The DC-to-DC converter of claim 2, wherein for setting the second DC link potential, a second DC link voltage between the second DC link potential and the common reference potential can be set by using the DC link regulator, independently of the DC voltage network voltages and the DC voltage network currents, or that for setting the first DC link potential a third DC link voltage between the first DC link potential and the common reference potential can be set by the DC link regulator, independently of the DC voltage network voltages and the DC voltage network currents.

5. The DC-to-DC converter of claim 1, wherein the DC link regulator is connected with the common reference potential.

6. The DC-to-DC converter of claim 1, wherein a DC voltage network voltage is supplied to the DC link regulator, and the DC link regulator has a potential separation.

7. The DC-to-DC converter of claim 1, wherein the DC link regulator is connected with the first DC link potential, the second DC link potential and the common reference potential.

8. The DC-to-DC converter of claim 1 wherein the DC link regulator is connected with one of the DC voltage mains connection, the first DC link potential and the common reference potential.

9. The DC-to-DC converter of claim 1, wherein a first DC-DC regulator and a second DC-DC regulator are configured in an identical manner that include each an equal amount of switches and diodes.

10. The DC-to-DC converter of claim 9, wherein a third DC-DC regulator is configured without an inductor.

11. The DC-to-DC converter of claim 1, wherein a DC link voltage supplied via the first DC link capacitor is lower than an input voltage and output voltage of the DC-to-DC converter.

12. A DC-to-DC converter, comprising:
a first, second, and third DC voltage network; and
a first, second, and third DC-DC regulator, wherein the first, second, and third regulator each having a DC voltage main connection that is supplied with a DC voltage network voltage related to a common reference potential, wherein each of the three DC-DC regulators include two or more semiconductor switches and a respective DC voltage network current flowing through each connection, the DC-DC regulators being coupled via a first DC-link capacitor connected between a first DC-link potential and a second DC-link potential, and the DC-DC regulators are each coupled with a DC-link regulator configured to set the first DC-link potential or the second DC-link potential independent of the DC voltage network voltages and the DC voltage network currents, the DC link regulator includes a transformer having a primary side winding and a secondary side winding, wherein the primary side winding of the transformer is connected via a full-bridge circuit with a primary side connection of the DC link regulator.

13. The DC-to-DC converter of claim 12, the DC link regulator can be connected with one of the DC voltage mains connections, the first DC-link potential and the common reference potential.

14. The DC-to-DC converter of claim 12, the DC-link regulator can be connected to one of the DC voltage mains connections, the second DC-link potential and the common reference potential.

15. The DC-to-DC converter of claim 12, wherein the DC link regulator is configured as a half-bridge circuit.

16. The DC-to-DC converter of claim 12, wherein the DC-DC regulators are coupled via the first DC-link capacitor in such a way that a first DC-link voltage is supplied via the first DC-link capacitor to the DC-DC regulators.

17. The DC-to-DC converter of claim 16, wherein a second DC-link capacitor is connected between the second DC-link potential and the common reference potential.

18. The DC-to-DC converter of claim 17, wherein a third DC-link capacitor is connected between the first DC-link potential and the common reference potential.

19. The DC-to-DC converter of claim 12, wherein the first DC link potential and the second DC link potential are different from the common reference potential.

20. A DC-to-DC converter for coupling at least three DC voltage networks, the converter comprising:
- at least three DC-DC regulators, each regulator having a DC voltage mains connection that is supplied with a DC voltage network voltage related to a common reference potential, wherein each of the three DC-DC regulators include two or more semiconductor switches;
- a respective DC voltage network current flowing through each connection, the DC-DC regulators being coupled using a first DC link capacitor that is connected between a first DC link potential and a second DC link potential, the first DC link potential and the second DC link potential being different from the common reference potential, and the at least three DC-DC regulators each being coupled with a DC link regulator configured to set the first DC link potential or the second DC link potential independent of the DC voltage network voltages and the DC voltage network currents; and
- a DC link regulator includes a transformer having a primary side winding and a secondary side winding, wherein the primary side winding of the transformer is connected via a first full-bridge circuit with a primary side connection of the DC link regulator, wherein the secondary side winding is connected via a second full-bridge circuit with a secondary side connection of the DC link regulator.

* * * * *